Patented May 12, 1925.

1,537,381

UNITED STATES PATENT OFFICE.

BENNO STRAUSS, OF ESSEN, GERMANY, ASSIGNOR TO FRIED. KRUPP AKTIENGE-SELLSCHAFT, OF ESSEN-ON-THE-RUHR, GERMANY.

CUTTING AND MILLING TOOL AND METHOD OF MANUFACTURING THE SAME.

No Drawing.     Application filed December 28, 1920. Serial No. 433,651.

(GRANTED UNDER THE PROVISIONS OF THE ACT OF MARCH 3, 1921, 41 STAT. L., 1313.)

*To all whom it may concern:*

Be it known that I, Dr. BENNO STRAUSS, residing at Essen, Germany, a citizen of the German Republic, have invented a certain new and useful Improvement in Cutting and Milling Tools and Methods of Manufacturing the Same (for which I filed application in Germany March 28, 1919), of which the following is a specification.

This invention relates to an improved method of manufacturing cutting and milling tools, remarkable for their particularly high efficiency.

The method consists in making the said tools of an alloy of iron—not capable of being hardened per se—comprising from 0.1 to 0.2% of carbon and 8 to 14% of chromium, then cementing them at the cutting edge in the customary manner, and finally subjecting the tools so made to the usual tempering process by first heating and then quenching them.

(It has been found expedient to add nickel to the alloy in a proportion of from 0.2 to 2%).

In the case of tools manufactured in accordance with the above-described method, it is only the cemented cutting edge which becomes glass-hardened whereas the adjoining layers of the steel obtain a gradually decreasing degree of hardness and great toughness, with the result that the cutting edge will be rendered specially capable of taking up the shocks created when working, without breaking off or snapping. This advantage will particularly also then be achieved on the entire tool being uniformly heated and then quenched as an entirety. The improved method is therefore specially suitable for such kinds of tools which, as, for example, milling cutters and face and side cutters, can only be hardened by being uniformly heated and thereupon quenched as entirety. For, in this case, tools of this type if made of common tool steel or of high speed tool steel, would not only become glass-hardened at the cutting edges but in an objectionable manner all over.

Furthermore, owing to the fact that in the case of tools made in accordance with this improved method, layers of steel of less hardness adjoin the glass-hardened cutting-edge, there is attained the advantage that the material, which becomes detached in the cutting operation, will gradually make a recess in the softer layers of steel disposed to the rear of the cutting-edge by exerting a grinding action thereon, and thus automatically serving to produce a favourable shaping of the cutting angle. This feature will be found to be of great importance for profile tools, the cutting edges of which can either not be backed off at all or only by the help of extremely intricate devices.

The efficiency of tools made in accordance with the improved method will be understood from the following statements:

In the case of a toothed rim of the module 9, having 60 teeth, made of tempered Siemens-Martin steel possessing a strength of 70 kilogs/sq. m., and the teeth of which had been continuously worked until the tool had become dull, the weight of the material taken off by cutting amounted to 13 kilogs on employing a common cutting tool, 26 kilogs on employing a high speed cutting tool, and 210 kilogs on employing a tool made in accordance with the present process. It will thus be seen that the efficiencies resulting are as 1:2:16.2. Attention may be directed in this connection to the feature that in the case of the tool made in accordance with the invention, the cutting depth was even 1.25 times as large as in the case of the other two tools, whereas, as regards the cutting speed and the feed action, the conditions were absolutely the same.

In the case of another test made (circular shaping of a toothed quadrant made of tempered Siemens-Martin steel) the efficiency obtained up to the period when the tools grew blunt amounted to 4.2 kilogs in the case of a tool made of ordinary tool steel, and 175 kilogs in the case of a tool made in accordance with the invention, this corresponding to a proportion of 1:41.7. In this particular case, the conditions as regards cutting speed, cutting depth and feed action were completely identical.

Taking the average, as a result of numerous tests of a similar kind made, it was found that tools made in accordance with the described method possessed a twentyfold superiority over tools made of common tool steel.

I claim:

1. A method of manufacturing cutting and milling tools of iron, not capable of being hardened per se, which consists in treating and alloy of steel comprising 0.1 to 0.2% of carbon and 8 to 14% of chromium by a cementing process at the cutting edges and then subjecting the tools to the customary tempering process.

2. A method as described in claim 1 with the addition to the alloy of nickel to an extent of from 0.5 to 2.0%.

3. A cutting or milling tool made of an alloy of steel comprising 0.1 to 0.2% of carbon and 8 to 14% of chromium with its cutting edges hardened by a cementing process.

4. A cutting or milling tool made of an alloy of steel comprising 0.1 to 0.2% of carbon 8 to 14% of chromium and 0.5 to 2.0% of nickel with its cutting edges hardened by a cementing process.

The foregoing specification signed at Essen, Germany, this 15th day of November, 1920.

DR. BENNO STRAUSS.

In presence of—
HANS GOTTSMANN,
JOHANN DECKERS.